(12) United States Patent
Akutsu et al.

(10) Patent No.: US 12,065,064 B2
(45) Date of Patent: Aug. 20, 2024

(54) CONVEYANCE SEAT AND CONVEYANCE SEAT MANUFACTURING METHOD

(71) Applicant: TS TECH CO., LTD., Saitama (JP)

(72) Inventors: Shuichi Akutsu, Tochigi (JP); Soichiro Tanaka, Tochigi (JP); Takamasa Sonoda, Tochigi (JP); Ryosuke Kojima, Tochigi (JP); Kazuya Aoki, Tochigi (JP); Muneyuki Nogami, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 16 days.

(21) Appl. No.: 17/919,580

(22) PCT Filed: Apr. 19, 2021

(86) PCT No.: PCT/JP2021/015907
§ 371 (c)(1),
(2) Date: Oct. 18, 2022

(87) PCT Pub. No.: WO2021/215406
PCT Pub. Date: Oct. 28, 2021

(65) Prior Publication Data
US 2023/0150410 A1    May 18, 2023

Related U.S. Application Data

(60) Provisional application No. 63/012,416, filed on Apr. 20, 2020, provisional application No. 63/012,348, filed on Apr. 20, 2020.

(51) Int. Cl.
*A47C 7/02* (2006.01)
*A47C 7/62* (2006.01)
(Continued)

(52) U.S. Cl.
CPC ............... *B60N 2/90* (2018.02); *A47C 7/622* (2018.08)

(58) Field of Classification Search
CPC .......... B60N 2/58; B60N 2/70; B60N 2/5825; B60N 2/60; B60N 2/90; B60R 2011/0015;
(Continued)

(56) References Cited

U.S. PATENT DOCUMENTS 3,479,085 A * 11/1969 Weinstein ............... B60N 2/60
297/228.1
5,004,295 A * 4/1991 Inoue ..................... B60N 2/70
297/188.07
(Continued)

FOREIGN PATENT DOCUMENTS

| JP | H10-327978 A | 12/1998 |
|---|---|---|
| JP | 2007-054460 A | 3/2007 |
| JP | 2010-105485 A | 5/2010 |
| JP | 2019-093820 A | 6/2019 |

OTHER PUBLICATIONS

International Search Report mailed on Jun. 22, 2021 for the corresponding PCT Application No. PCT/JP2021/015907, with English machine translation.

*Primary Examiner* — Shin H Kim
(74) *Attorney, Agent, or Firm* — Michael Best & Friedrich LLP

(57) ABSTRACT

A conveyance seat includes a large-capacity pocket formed on the rear surface of a seat back of the seat. The pocket has: a pocket forming sheet overlapping an outer surface of a back side skin material positioned on the rear surface of the seat back; and a pocket sewn portion. The pocket sewn portion has: right and left first sewn portions and right and left second sewn portions formed at positions sandwiching an opening portion in a seat width direction to form the opening portion of the pocket in an upper end portion of the
(Continued)

pocket forming sheet; right and left third sewn portions forming right and left outer edge portions of the pocket; and a fourth sewn portion forming a lower edge portion of the pocket. The right and left second sewn portions are disposed inside the right and left third sewn portions in the seat width direction.

14 Claims, 14 Drawing Sheets

(51) Int. Cl.
  *B60N 2/58* (2006.01)
  *B60N 2/90* (2018.01)
  *B60R 7/00* (2006.01)
  *B60R 13/02* (2006.01)

(58) Field of Classification Search
  CPC ..... B60R 2011/0075; B60R 2013/0287; B60R 7/005; B60R 7/043
  See application file for complete search history.

(56) References Cited

U.S. PATENT DOCUMENTS

| | | | | |
|---|---|---|---|---|
| 5,295,732 A * | 3/1994 | Boisset | ............... | B60N 2/5825 |
| | | | | 297/228.1 |
| 8,967,712 B2 * | 3/2015 | Yasuda | .................. | B60N 2/58 |
| | | | | 297/452.62 |
| 2010/0102601 A1 * | 4/2010 | Yasuda | .................. | B60N 2/58 |
| | | | | 297/188.04 |

\* cited by examiner

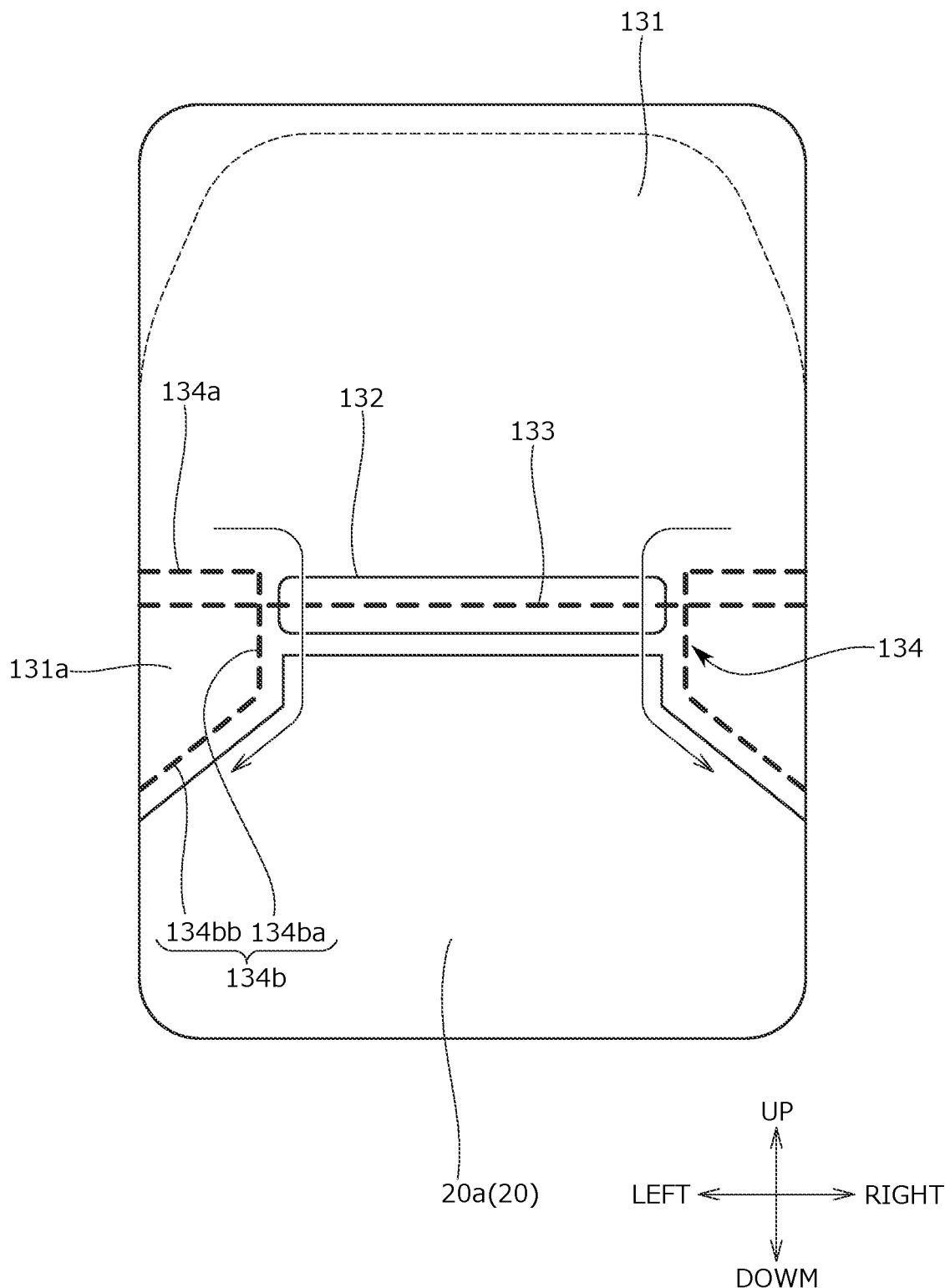

CONVEYANCE SEAT AND CONVEYANCE SEAT MANUFACTURING METHOD

CROSS-REFERENCE TO RELATED APPLICATIONS

This application is a National Entry application of PCT Application Serial Number PCT/JP2021/015907, filed Apr. 19, 2021. Further, this application claims priority from U.S. Provisional Patent Application Ser. No. 63/012,348, filed Apr. 20, 2020, and 63/012,416, filed on Apr. 20, 2020, the entire contents of which are hereby incorporated by reference into this application.

TECHNICAL FIELD

The present invention relates to a conveyance seat and a method for manufacturing the conveyance seat. More particularly, the present invention relates to a conveyance seat having a pocket on the rear surface of a seat back and a method for manufacturing the conveyance seat.

BACKGROUND ART

Known in the related art is a conveyance seat having a seat back configured by placing a cushion material on a back frame serving as a skeleton and covering the cushion material with a skin material. The conveyance seat may be formed with a bag-shaped pocket attached by sewing to the outer surface of a back side skin material positioned on the rear surface of the seat back and capable of storing a small article or the like (see, for example, Patent Literature 1 and Patent Literature 2).

The vehicle seat disclosed in Patent Literature 1 includes a pocket attached by sewing to the rear surface of a seat back. The pocket is sized to reach the right and left end portions of the seat back in the seat width direction, and the opening portion of the pocket is also elongated so as to reach the right and left end portions of the seat back.

Likewise, the conveyance seat described in Patent Literature 2 has a pocket attached by sewing to the rear surface of a seat back. The pocket is disposed at the middle part of the seat back in the seat width direction and is somewhat narrower than the seat back. In addition, the opening portion of the pocket also has a length corresponding to the size of the pocket.

CITATION LIST

Patent Literature

PATENT LITERATURE 1: JP H10-327978
PATENT LITERATURE 2: JP 2010-105485 A

SUMMARY OF INVENTION

Technical Problem

By the way, in the case of the pocket shape of the vehicle seat as in Patent Literature 1, although the capacity can be relatively large, the opening portion of the pocket extends to the right and left end portions of the seat back, and thus the opening portion is not closed with ease, the appearance of the vehicle seat is not satisfactory, and the design may be impaired.

In addition, in the case of the pocket shape of the conveyance seat as in Patent Literature 2, the length of the opening portion of the pocket corresponds to the size of the pocket and, although the appearance of the conveyance seat is not impaired, the capacity of the pocket may decrease to cause a decline in functionality.

Accordingly, there has been a demand for a technique enabling pocket capacity maximization without impairing the appearance of a conveyance seat during pocket formation on the rear surface of the conveyance seat.

Further, there has been a demand for a technique with which a pocket on the rear surface of a conveyance seat can be formed in a relatively simple manner.

The present invention has been made in view of the above problems, and an object of the present invention is to provide a conveyance seat and a method for manufacturing the conveyance seat with which the capacity of a pocket can be ensured without impairing the appearance of the conveyance seat in forming the pocket on the rear surface of the conveyance seat.

In addition, another object of the present invention is to provide a conveyance seat and a method for manufacturing the conveyance seat enabling simple pocket formation on the rear surface thereof.

Solution to Problem

The above object is achieved by means of the conveyance seat of the present invention, which is a conveyance seat provided with a pocket on a rear surface of a seat back, in which the seat back has a skin material serving as a covering material for the seat back, the pocket has: a sheet-shaped pocket forming member overlapping an outer surface of a back side skin material positioned on the rear surface of the seat back; and a pocket sewn portion for attaching the pocket forming member to the back side skin material in an overlapping state, the pocket sewn portion has: right and left first sewn portions provided in order to form an opening portion of the pocket in an upper end portion of the pocket forming member, formed at positions sandwiching the opening portion in a seat width direction, and each extending in the seat width direction; right and left second sewn portions formed at positions sandwiching the opening portion in the seat width direction, respectively connected to the right and left first sewn portions, and extending in a direction intersecting the right and left first sewn portions; right and left third sewn portions respectively formed in both end portions of the pocket forming member in the seat width direction in order to form right and left outer edge portions of the pocket and extending in an up to down direction; and a fourth sewn portion formed in a lower end portion of the pocket forming member in order to form a lower edge portion of the pocket and extending in the seat width direction, and the right and left second sewn portions are disposed inside the right and left third sewn portions in the seat width direction.

With the above configuration, it is possible to realize a conveyance seat with which the capacity of a pocket can be ensured without impairing the appearance of the conveyance seat.

Specifically, the pocket sewn portion has: right and left first sewn portions provided in order to form an opening portion of the pocket in an upper end portion of the pocket forming member, formed at positions sandwiching the opening portion in a seat width direction, and each extending in the seat width direction; and right and left second sewn portions formed at positions sandwiching the opening portion in the seat width direction, respectively connected to the right and left first sewn portions, and extending in a direction intersecting the right and left first sewn portions. In other words, the opening portion of the pocket is formed at the middle part of the seat back in the seat width direction and does not have a length of reaching the right and left end portions of the seat back. Accordingly, with the shape of the opening portion, the appearance of the conveyance seat is not impaired.

In addition, the right and left second sewn portions at the positions sandwiching the opening portion of the pocket are disposed inside the right and left third sewn portions forming the right and left outer edge portions of the pocket in the seat width direction. In other words, in this configuration, the opening portion of the pocket is narrow and the accommodating portion of the pocket is wide.

Accordingly, the capacity of the pocket can be ensured (increased) with the shape of the opening portion.

At this time, in a state where a surface of the pocket forming member partially overlaps the outer surface of the back side skin material, the right and left first sewn portions and the right and left second sewn portions may be formed at the overlapping part, and, in a state where a part other than the overlapping part is folded back via a fold provided on the pocket forming member, the right and left third sewn portions and the fourth sewn portion may be formed at the folded part.

With the above configuration, when the pocket is formed on the rear surface of the conveyance seat, the sewing line can be made as inconspicuous as possible and design can be ensured. In addition, the pocket can be manufactured by a relatively simple manufacturing method.

At this time, the pocket may have a plate-shaped plate member attached to the pocket forming member at a position corresponding to the opening portion and extending in the seat width direction along the opening portion, and the plate member may be disposed between the right and left second sewn portions in the seat width direction and may be disposed at a position not intersecting the right and left second sewn portions.

With the above configuration, the strength of and around the opening portion of the pocket can be increased and the functionality of the pocket can be increased.

In addition, the pocket is easily formed by having the plate member.

At this time, the pocket may have a plate sewn portion for attaching the plate member to the pocket forming member, and the plate sewn portion may extend in the seat width direction along the extension direction of the plate member and may intersect the right and left second sewn portions.

With the above configuration, the sewing strength around the opening portion of the pocket can be increased. In other words, the sewing strength of the first sewn portion and the second sewn portion can be increased.

At this time, the right and left second sewn portions may respectively extend in a direction substantially orthogonal to the right and left first sewn portions.

With the above configuration, interference with the second sewn portion can be avoided as much as possible when an occupant uses the pocket (puts his or her hand into the pocket).

At this time, the second sewn portion may have: a first extending portion extending in a direction intersecting the first sewn portion; and a second extending portion connected to the first extending portion and extending outward in the seat width direction from the first extending portion in a direction intersecting the first extending portion.

In addition, the second extending portion of the second sewn portion may extend in a direction inclined with respect to the first sewn portion.

In addition, the second extending portion of the second sewn portion may extend outward in the seat width direction away from the first sewn portion.

With the above configuration, the sewing strength of and around the opening portion of the pocket (right and left end portions of the opening portion) can be further increased.

In addition, with the above configuration, interference with the second sewn portion can be avoided when an occupant puts a small article into the pocket or takes a small article out of the pocket.

In addition, the above object is achieved by means of a method for manufacturing a conveyance seat provided with a pocket on a rear surface of a seat back, the conveyance seat manufacturing method including a step of manufacturing the pocket, in which, in the step of manufacturing the pocket, a sheet-shaped pocket forming member is caused to overlap an outer surface of a back side skin material disposed on the rear surface of the seat back as a part of a skin material serving as a covering material for the seat back, and the pocket forming member is attached to the back side skin material by a pocket sewn portion in an overlapping state, and, when the pocket forming member is attached, the pocket forming member is attached by: right and left first sewn portions provided in order to form an opening portion of the pocket in an upper end portion of the pocket forming member, formed at positions sandwiching the opening portion in a seat width direction, and each extending in the seat width direction; right and left second sewn portions formed at positions sandwiching the opening portion in the seat width direction, respectively connected to the right and left first sewn portions, and extending in a direction intersecting the right and left first sewn portions; right and left third sewn portions respectively formed in both end portions of the pocket forming member in the seat width direction in order to form right and left outer edge portions of the pocket and extending in an up to down direction such that the right and left second sewn portions are disposed inside in the seat width direction; and a fourth sewn portion formed in a lower end portion of the pocket forming member in order to form a lower edge portion of the pocket and extending in the seat width direction.

At this time, when the pocket forming member is attached, in a state where a surface of the pocket forming member partially overlaps the outer surface of the back side skin material, the overlapping part may be attached by the right and left first sewn portions and the right and left second sewn portions, and, in a state where a part other than the overlapping part is folded back via a fold provided on the pocket forming member, the folded part may be further attached by the right and left third sewn portions and the fourth sewn portion.

Advantageous Effects of Invention

According to the present invention, it is possible to realize a conveyance seat with which the capacity of a pocket can be ensured without impairing the appearance of the conveyance seat.

Specifically, the opening portion of the pocket is formed at the middle part of the seat back in the seat width direction and does not have a length of reaching the right and left end portions of the seat back. Accordingly, with the shape of the opening portion, the appearance of the conveyance seat is not impaired.

In addition, in this configuration, the opening portion of the pocket is narrow and the accommodating portion of the pocket is wide. Accordingly, the capacity of the pocket can be ensured (increased) with the shape of the opening portion.

In addition, according to the present invention, the sewing line can be made as inconspicuous as possible and design can be ensured. In addition, the pocket can be manufactured by a relatively simple manufacturing method.

In addition, according to the present invention, the strength of and around the opening portion of the pocket can be increased and the functionality of the pocket can be increased. In addition, the pocket is easily formed.

In addition, according to the present invention, the sewing strength around the opening portion of the pocket can be increased.

In addition, according to the present invention, interference with the second sewn portion can be avoided when an occupant uses the pocket (puts his or her hand into the pocket).

In addition, according to the present invention, the sewing strength of and around the opening portion of the pocket (right and left end portions of the opening portion) can be further increased. In addition, interference with the second sewn portion can be avoided when an occupant puts a small article into the pocket or takes a small article out of the pocket.

BRIEF DESCRIPTION OF DRAWINGS

FIG. 4B is a diagram illustrating a state where the pocket forming member of FIG. 4A overlaps and is sewn to a back side skin material.

DESCRIPTION OF EMBODIMENTS

Embodiments according to the present invention will be described below with reference to FIGS. 1 to 7.

The present embodiment relates to an invention of a conveyance seat provided with a pocket on a rear surface of a seat back, in which the pocket has: a sheet-shaped pocket forming member overlapping an outer surface of a back side skin material positioned on the rear surface of the seat back; and a pocket sewn portion, the pocket sewn portion has: right and left first sewn portions provided in order to form an opening portion of the pocket in an upper end portion of the pocket forming member and formed at positions sandwiching the opening portion in a seat width direction; right and left second sewn portions formed at positions sandwiching the opening portion and extending in a direction intersecting the right and left first sewn portions; right and left third sewn portions forming right and left outer edge portions of the pocket; and a fourth sewn portion forming a lower edge portion of the pocket, and the right and left second sewn portions are disposed inside the right and left third sewn portions.

It should be noted that the side on which an occupant sits with respect to the seat back of the conveyance seat is the front side of the seat.

Figure 1:
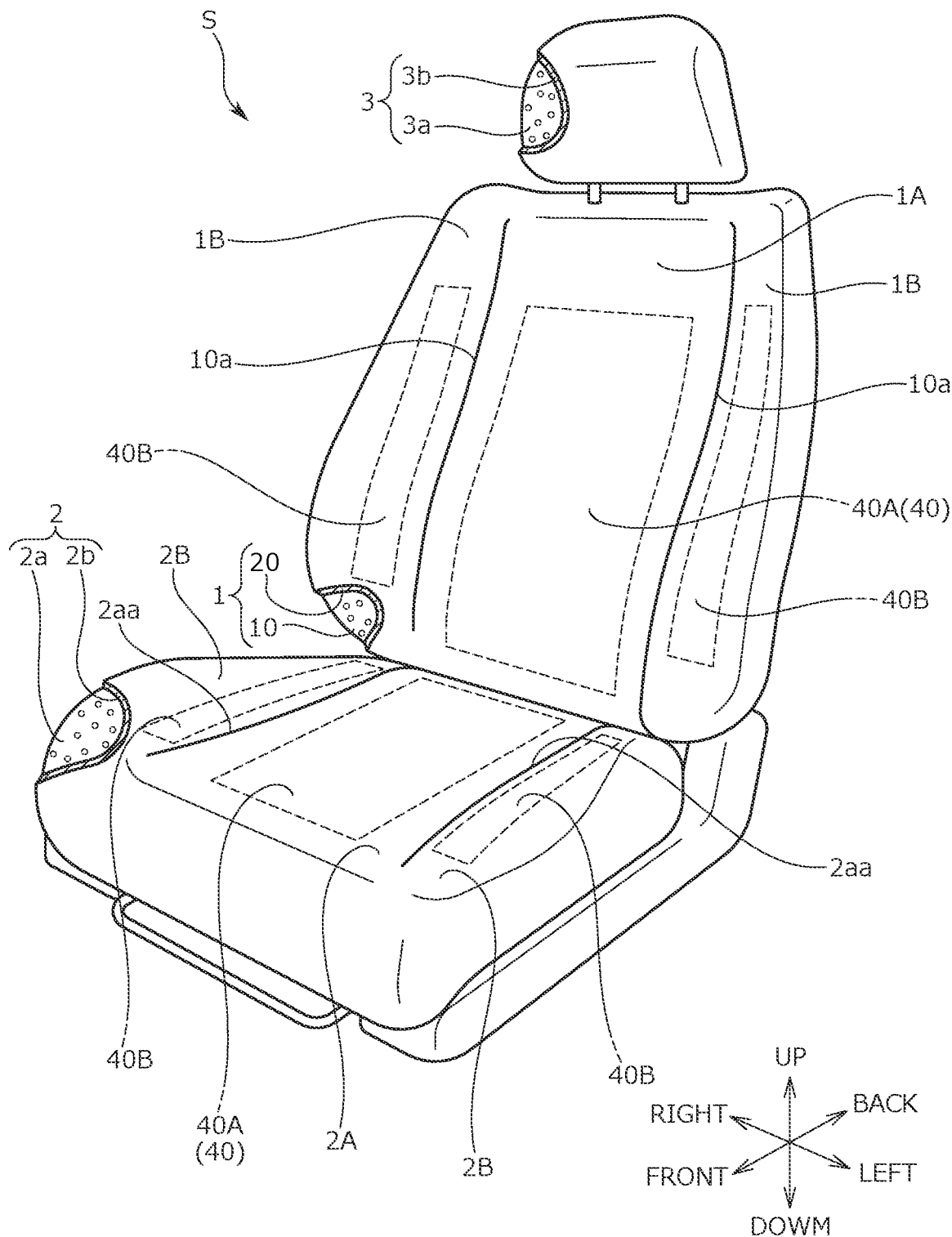
FIG. 1 is an external perspective view of a conveyance seat according to the present embodiment.

As illustrated in FIG. 1, a conveyance seat S of the present embodiment is a vehicle seat and is configured mainly from a seat main body including a seat back 1, a seat cushion 2, and a headrest 3, a pocket 30 attached to the rear surface of the seat back 1, and a sheet-shaped seat heater 40 attached in the seat main body.

Figure 2:
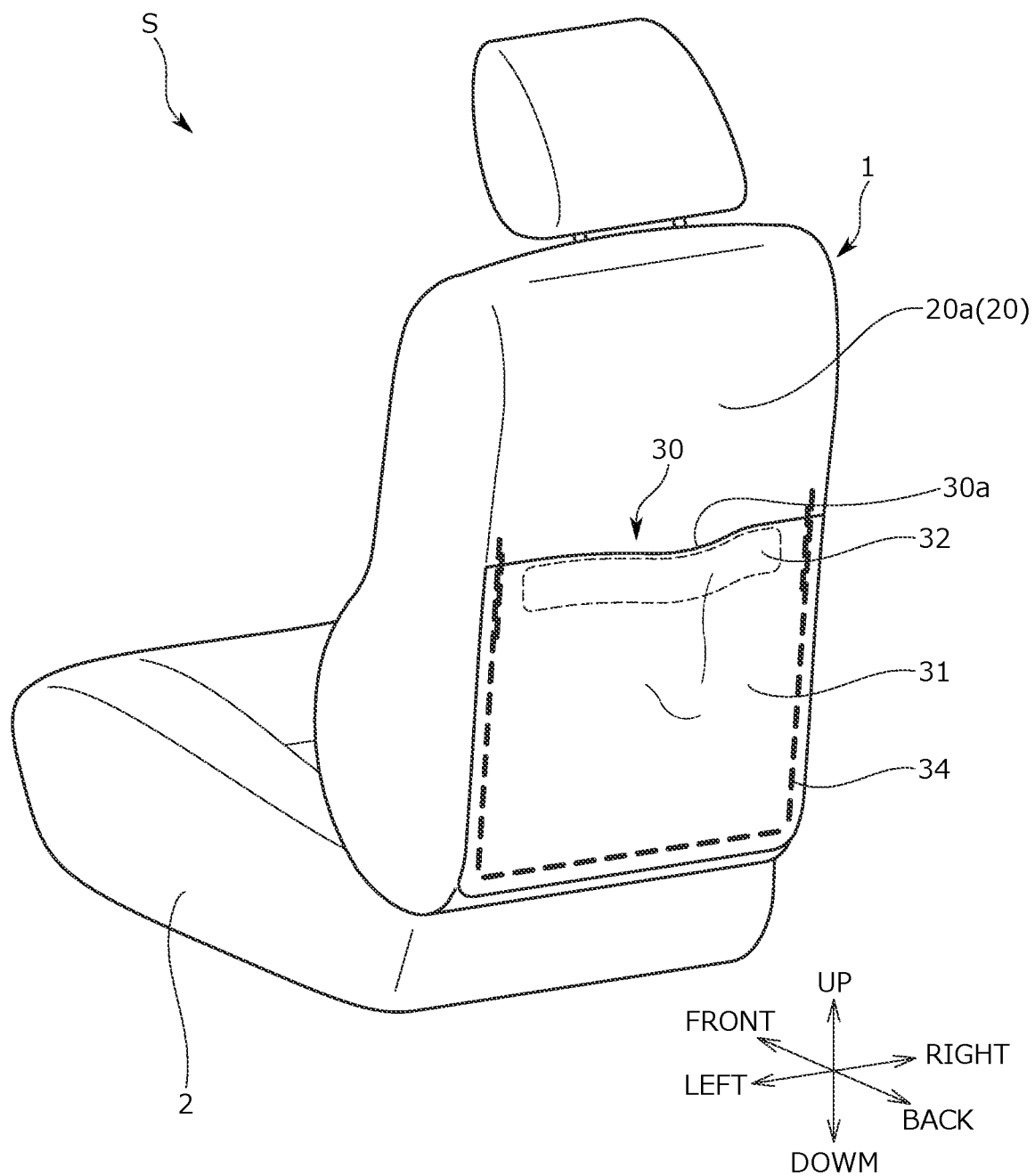
FIG. 2 is a perspective view of the conveyance seat viewed from a rear surface side.

As illustrated in FIGS. 1 and 2, the seat back 1 is a backrest portion supporting a seated occupant's back from behind and is configured by placing a cushion material 10 on a back frame (not illustrated) serving as a skeleton and covering the cushion material 10 with a skin material 20.

The seat back 1 is configured from a middle portion 1A at the middle part in the seat width direction and right and left side portions 1B (side bolster portions) outside the middle portion 1A in the seat width direction.

Right and left skin pull-in grooves 10a extending in the up to down direction are formed on the surface of the cushion material 10 so as to divide the middle portion 1A and the right and left side portions 1B.

The bag-shaped pocket 30 capable of storing a small article or the like is attached by sewing to the rear surface of the seat back 1.

As illustrated in FIG. 1, the seat cushion 2 is a seating portion supporting the seated occupant from below and is configured by placing a cushion material 2a on a cushion frame (not illustrated) serving as a skeleton and covering the cushion material 2a with a skin material 2b.

Similarly, the seat cushion 2 is configured from a middle portion 2A at the middle part in the seat width direction and right and left side portions 2B (side bolster portions) outside the middle portion 2A in the seat width direction.

Right and left skin pull-in grooves 2aa extending in the up to down direction are formed on the surface of the cushion material 2a so as to divide the middle portion 2A and the right and left side portions 2B.

The headrest 3 is a head portion supporting the occupant's head from behind and is configured by placing a cushion material 3a on a headrest pillar (not illustrated) serving as a core material and covering the cushion material 3a with a skin material 3b.

The cushion material 10 is a pad member made of foamed urethane or the like.

The skin material 20 is made of a resin material (for example, TPO), fabric (for example, PET material), genuine leather, or the like and is formed in a shape in which the cushion material 10 can be covered from the outside.

In the above configuration, as illustrated in FIG. 1, the seat heater 40 is attached between the cushion material 10 and the skin material 20 in the seat back 1.

It should be noted that the seat heater 40 is also attached between the cushion material 2a and the skin material 2b in the seat cushion 2.

As illustrated in FIGS. 2 and 3A to 3D, the pocket 30 is a bag-shaped pocket (back pocket) formed on the lower part of the rear surface of the seat back 1 and has an opening portion 30a in the upper end portion thereof.

The pocket 30 has a sheet-shaped pocket forming sheet 31 (pocket forming member) overlapping the outer surface of a back side skin material 20a positioned on the rear surface of the seat back 1 and a plate-shaped plate member 32 attached to the pocket forming sheet 31 at a position corresponding to the opening portion 30a.

Figure 3A:
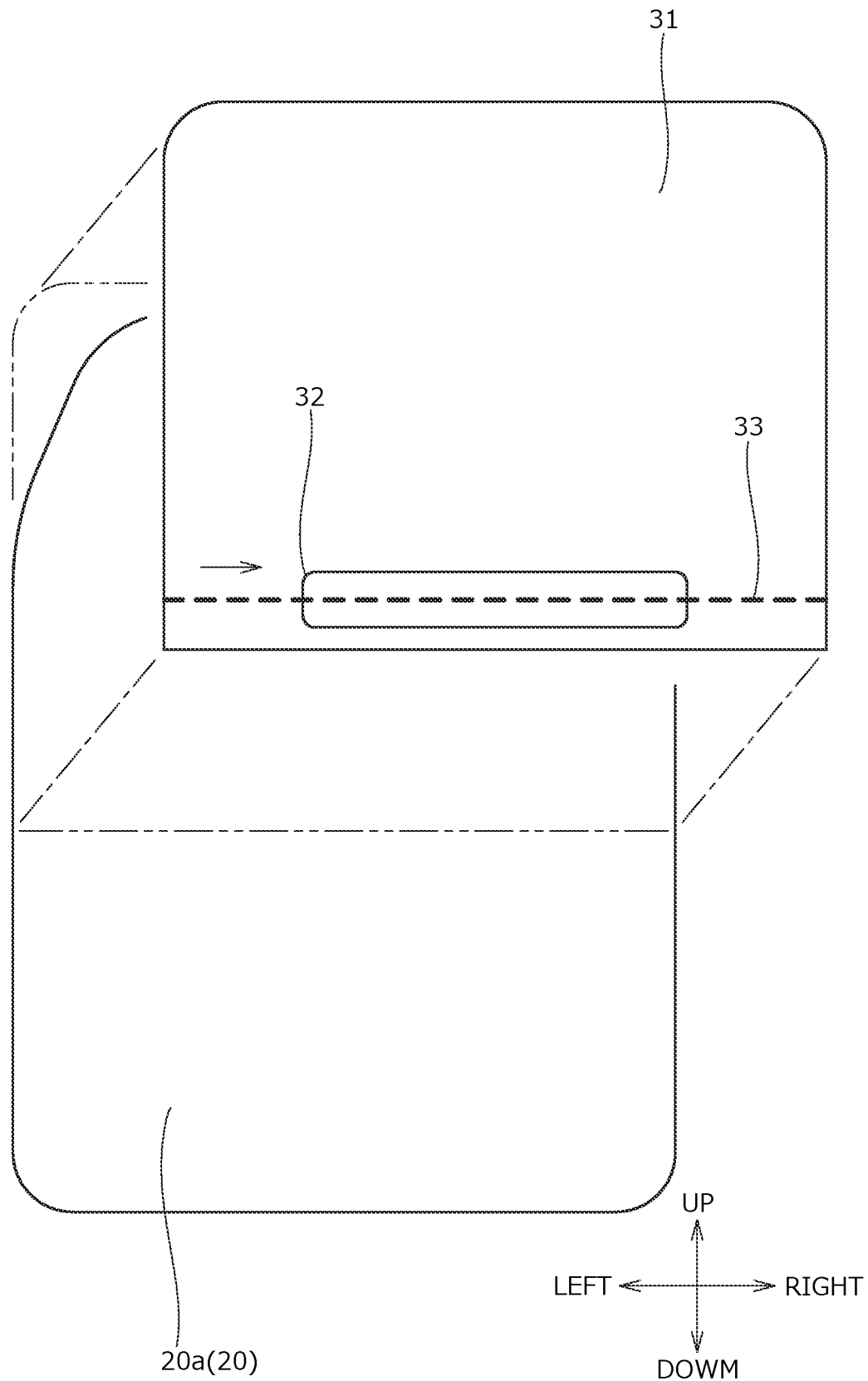
FIG. 3A is a diagram illustrating a state where a plate member is sewn to a pocket forming member.
Figure 3B:
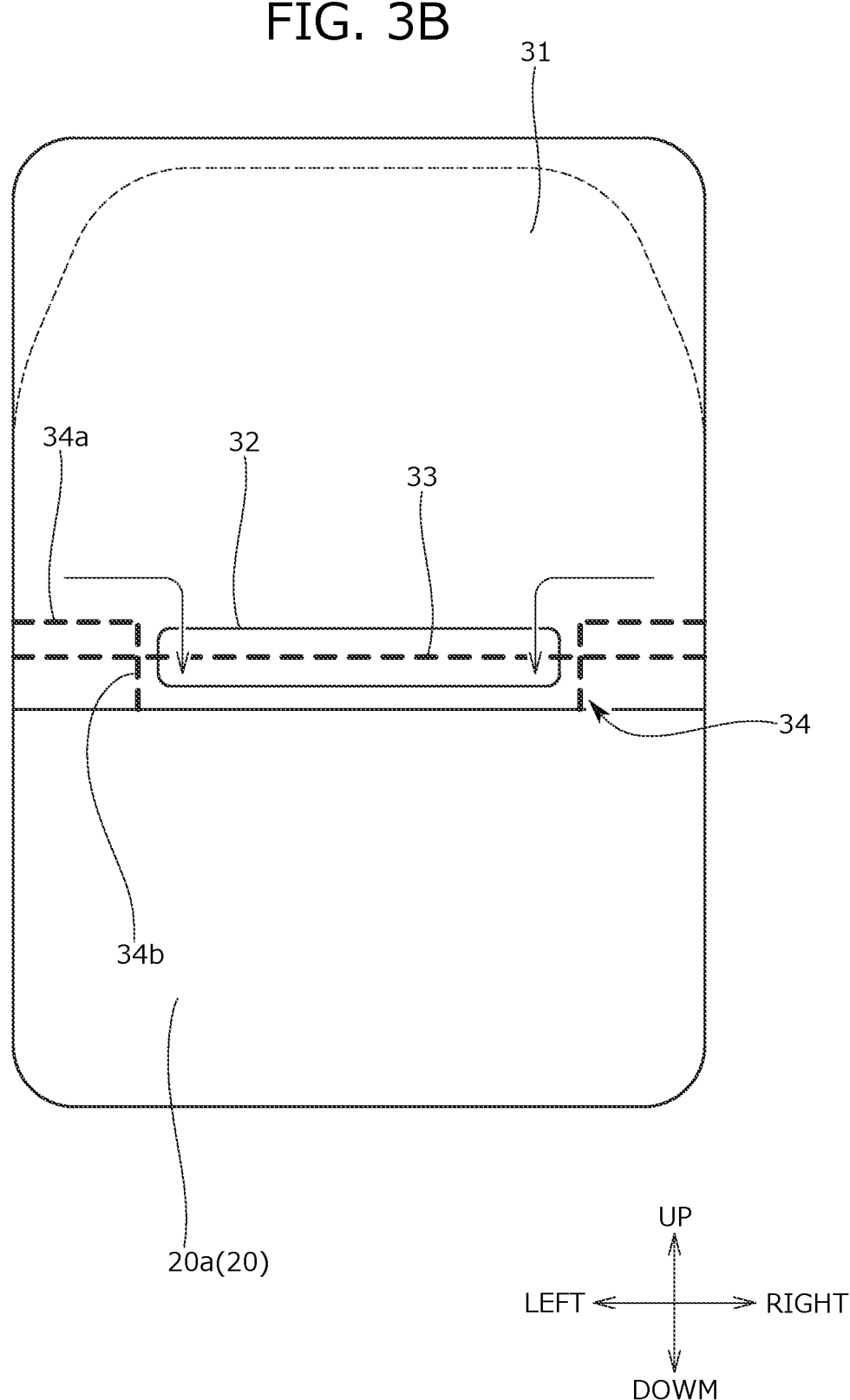
FIG. 3B is a diagram illustrating a state where the pocket forming member of FIG. 3A overlaps and is sewn to a back side skin material.
Figure 3C:
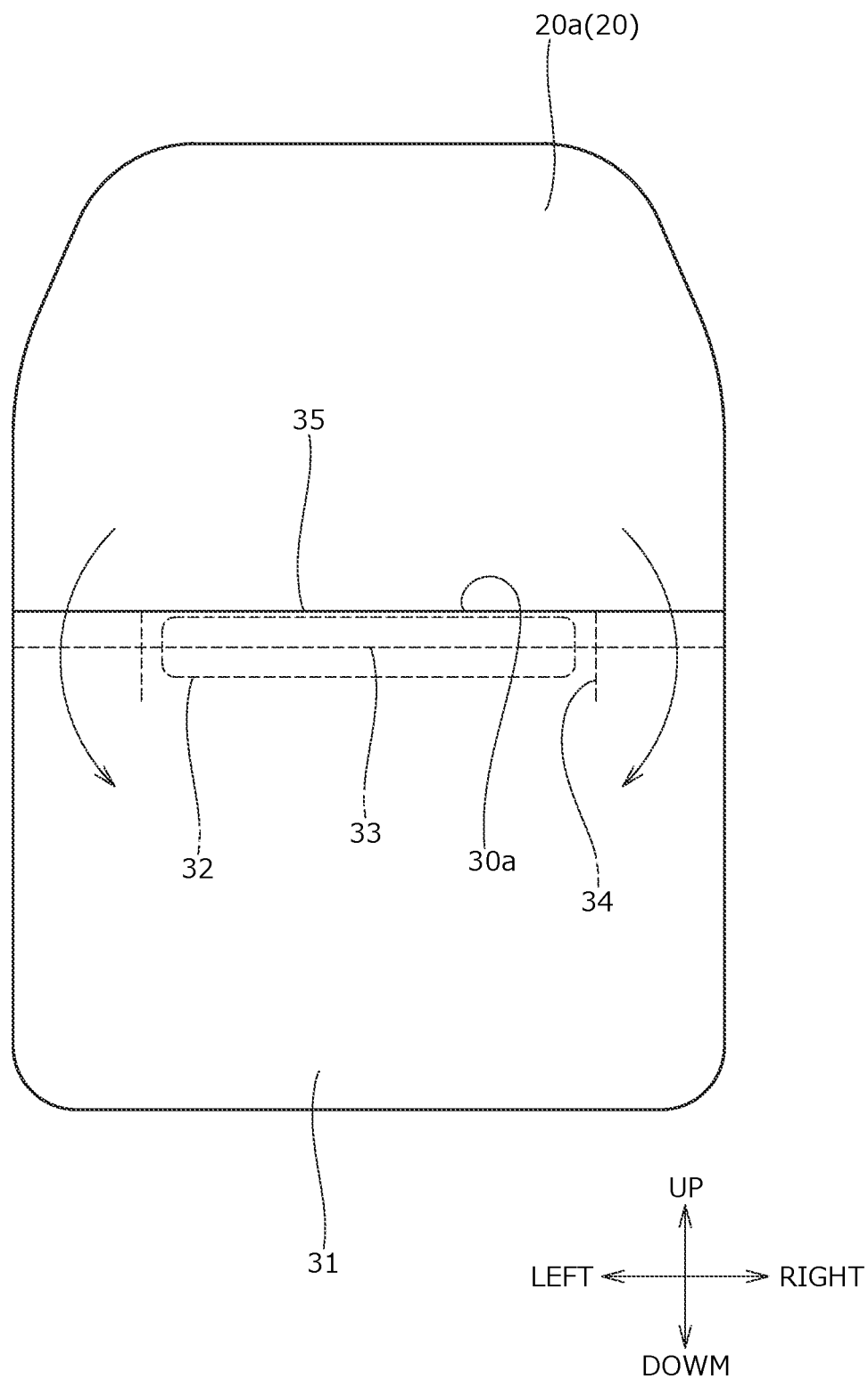
FIG. 3C is a diagram illustrating a folded state of the pocket forming member of FIG. 3B.
Figure 3D:
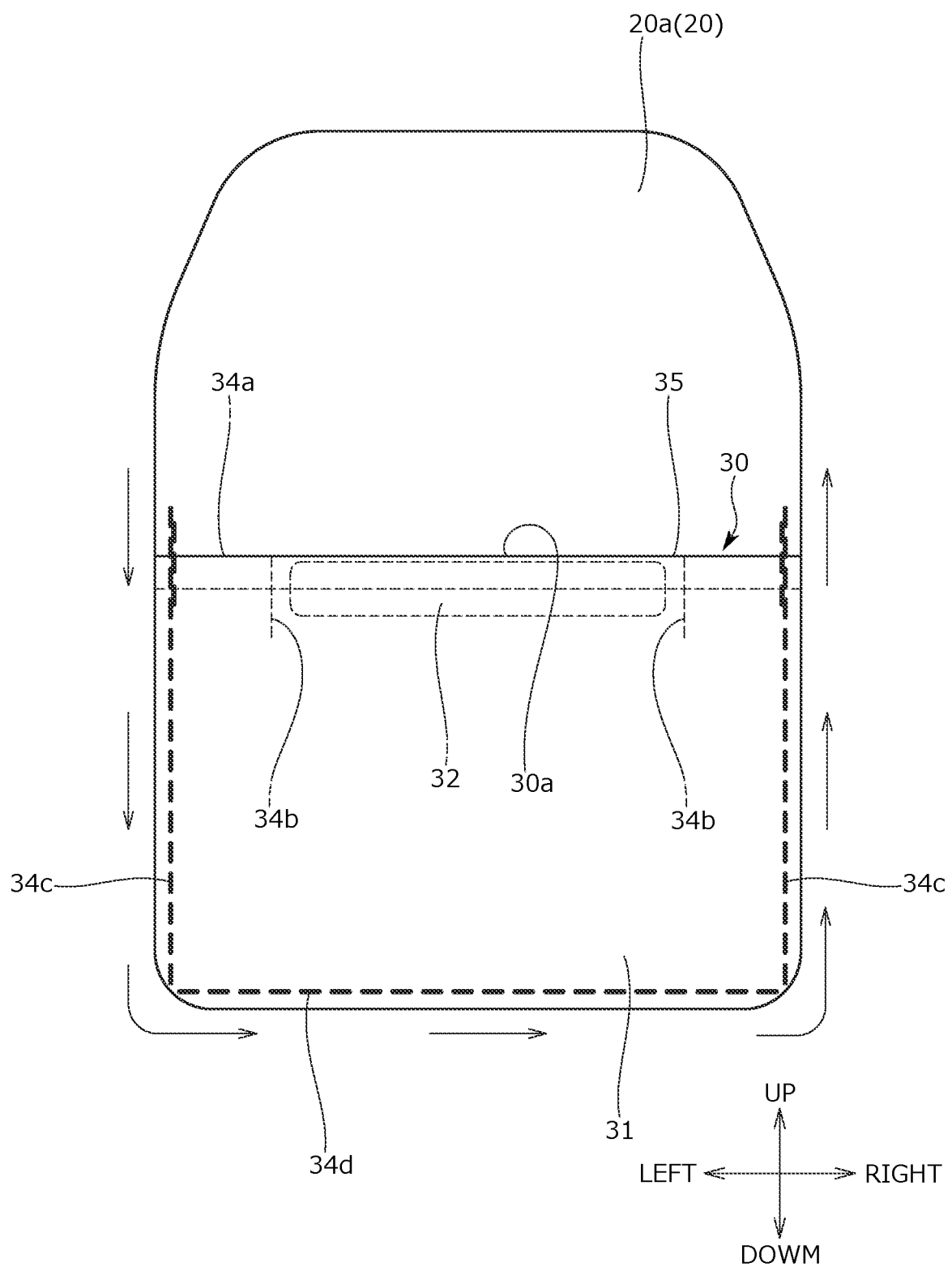
FIG. 3D is a diagram illustrating a state where the pocket forming member is sewn from the state of FIG. 3C.
Figure 4A:
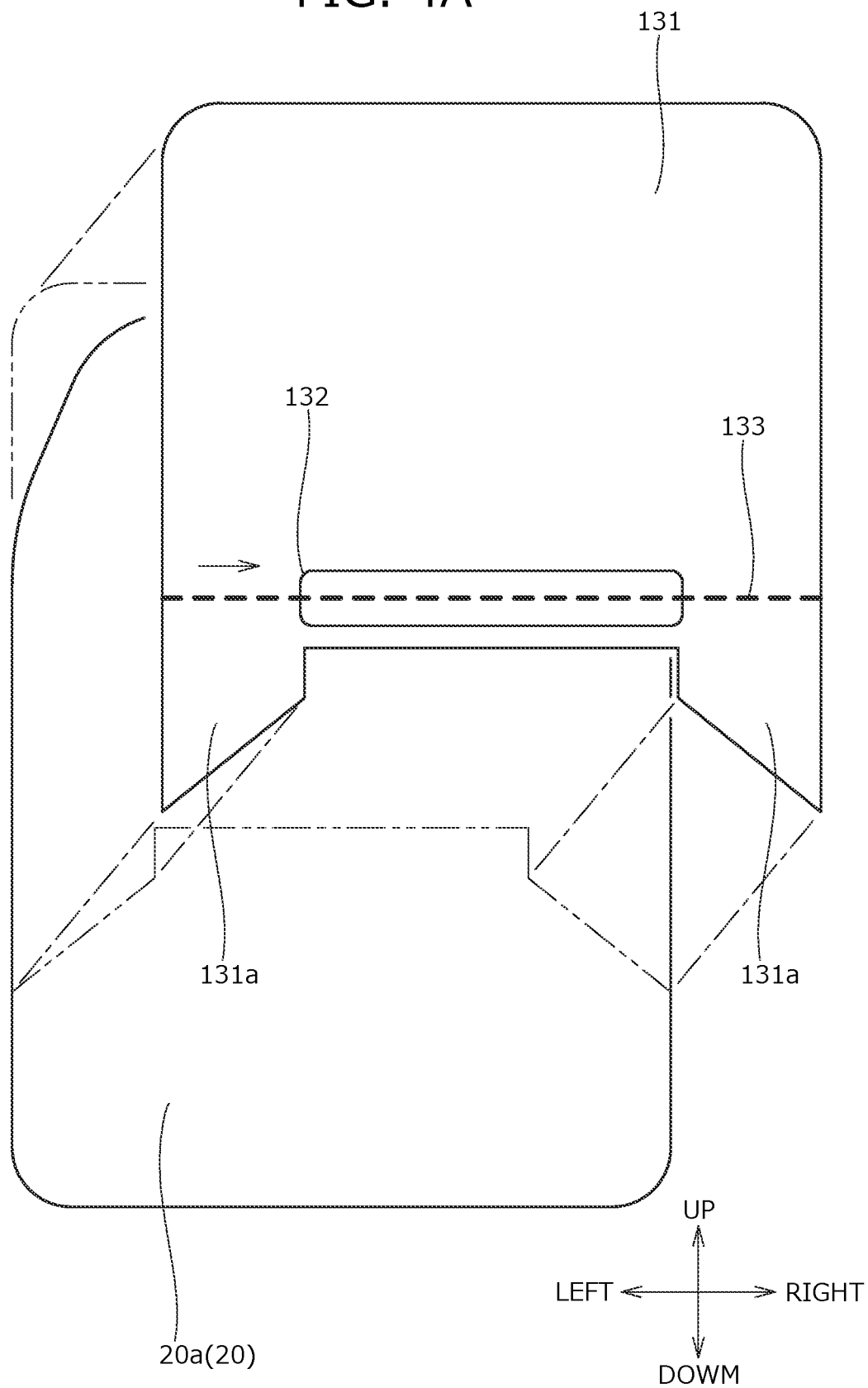
FIG. 4A is a diagram illustrating a state where a plate member is sewn to a pocket forming member of a second embodiment.
Figure 4C:
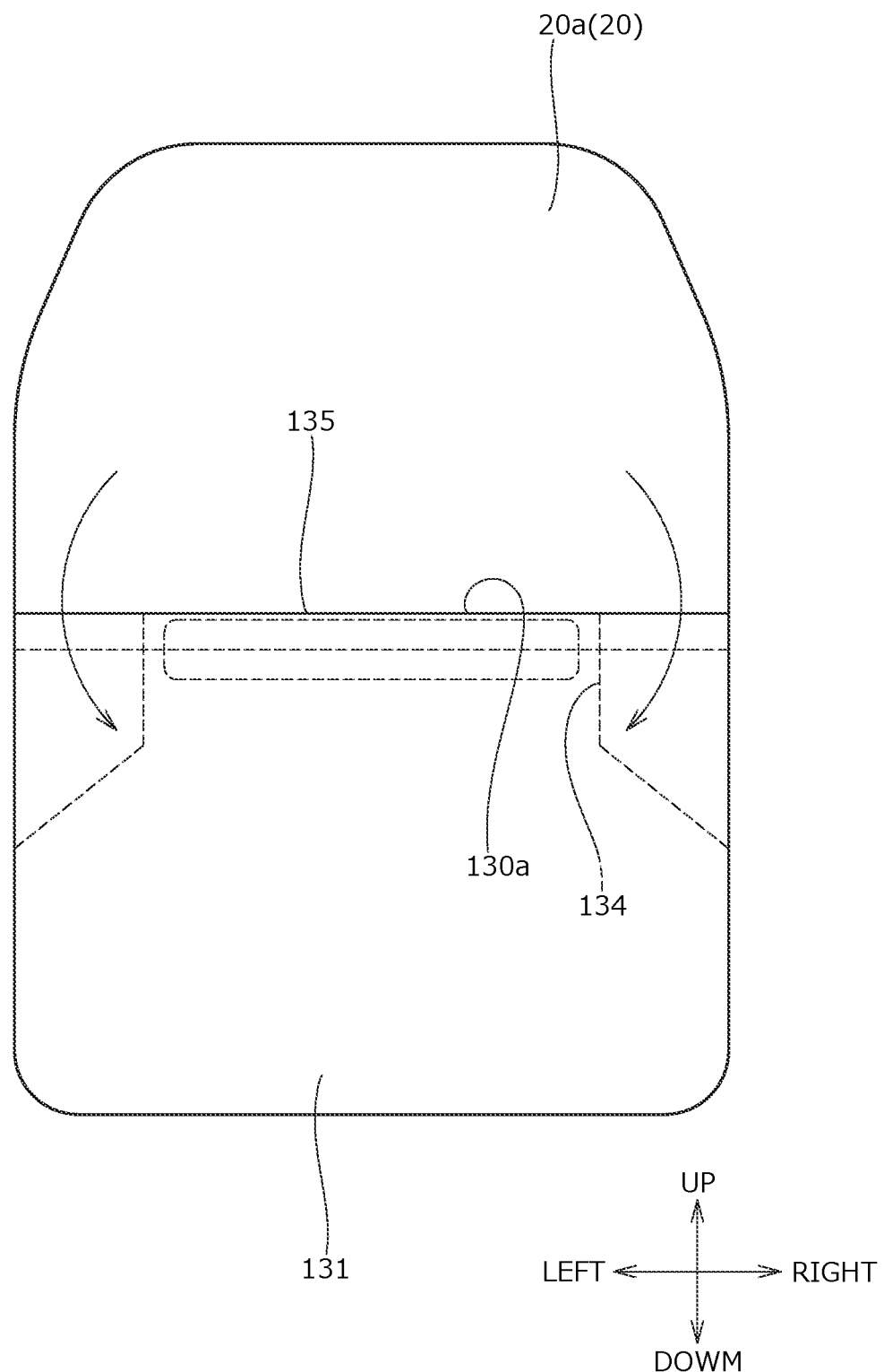
FIG. 4C is a diagram illustrating a folded state of the pocket forming member of FIG. 4B.
Figure 4D:
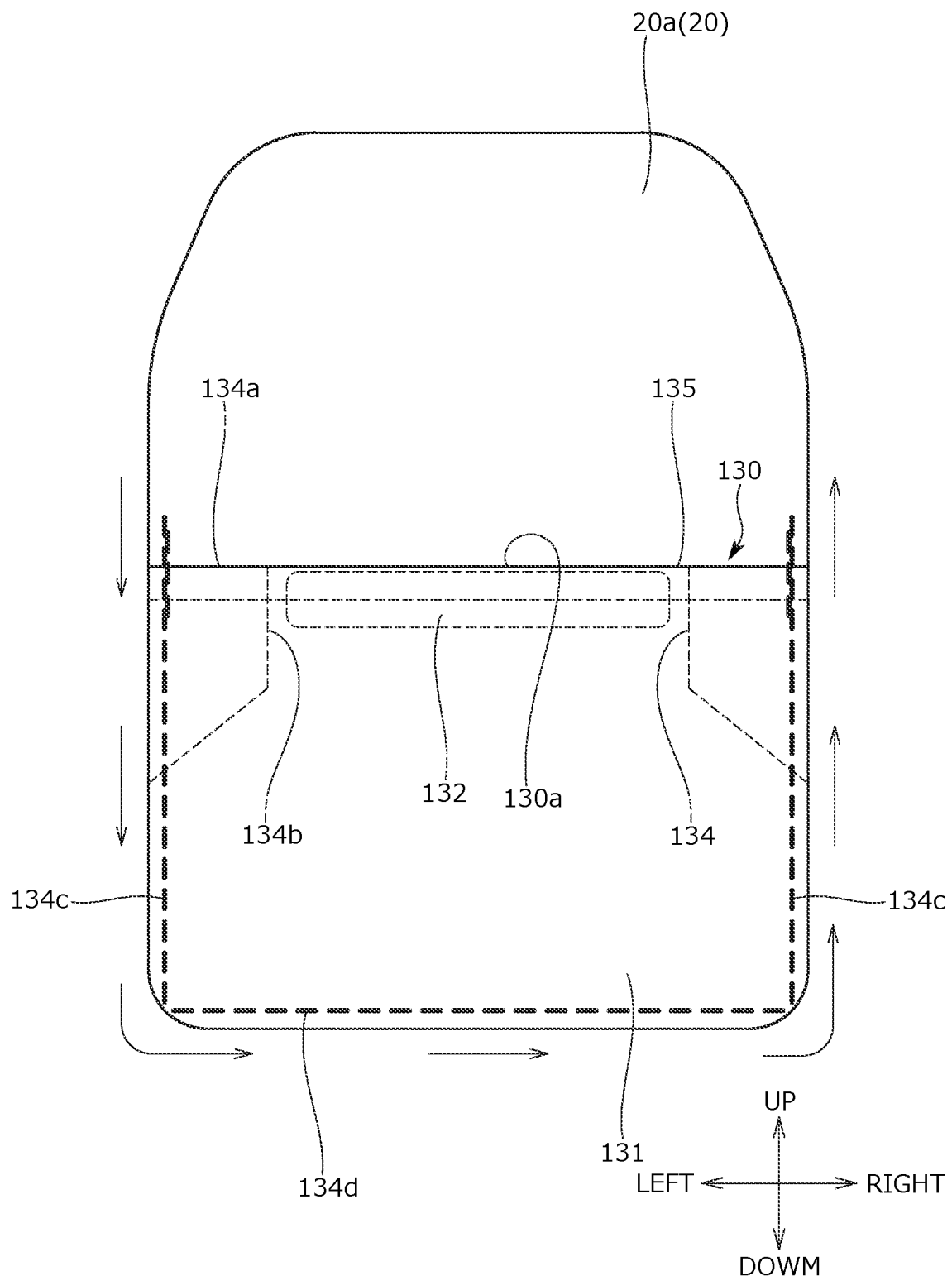
FIG. 4D is a diagram illustrating a state where the pocket forming member is sewn from the state of FIG. 4C.

In addition, the pocket 30 has a plate sewn portion 33 for attaching the plate member 32 to the pocket forming sheet 31 as illustrated in FIG. 3A and a pocket sewn portion 34 for attaching the pocket forming sheet 31 to the back side skin material 20a in an overlapping state as illustrated in FIGS. 3B to 3D.

The pocket forming sheet 31 is formed of a sheet-shaped material similarly to the skin material 20 and is a substantially rectangular sheet for forming the pocket 30.

As illustrated in FIG. 3A, the plate-shaped plate member 32 elongated in the seat width direction is attached to one end portion of the back surface of the pocket forming sheet 31 in the up to down direction.

The plate member 32 is a reinforcing member increasing the strength of the opening portion 30a of the pocket 30 and is formed of a resin material having predetermined hardness and elasticity.

As illustrated in FIG. 3D, the length of the plate member 32 corresponds to the length of the opening portion 30a of the pocket 30.

The plate sewn portion 33 extends along the extension direction of the plate member 32 and straddles the plate member 32 in the seat width direction to reach the right and left end portions of the pocket forming sheet 31.

It should be noted that the plate sewn portion 33 and the pocket sewn portion 34 are sewn parts formed by, for example, sewing work using a known automatic sewing machine (XY automatic sewing machine).

As illustrated in FIGS. 3B and 3D, the pocket sewn portion 34 has right and left first sewn portions 34a and right and left second sewn portions 34b forming the upper edge portion of the pocket 30 and forming (partitioning) the opening portion of the pocket 30, right and left third sewn portions 34c forming the right and left outer edge portions of the pocket 30, and a fourth sewn portion 34d forming the lower edge portion of the pocket 30.

As illustrated in FIG. 3B, in a state where the surface of the pocket forming sheet 31 partially overlaps the outer surface of the back side skin material 20a, the right and left first sewn portions 34a and the right and left second sewn portions 34b are formed at the overlapping part.

Meanwhile, as illustrated in FIGS. 3B to 3D, in a state where the upper part other than the overlapping part (part different from the overlapping part) is folded back via a fold 35 provided on the pocket forming sheet 31, the right and left third sewn portions 34c and the fourth sewn portion 34d are formed at the folded part.

As illustrated in FIG. 3B, the right and left first sewn portions 34a are formed at positions sandwiching the opening portion 30a in the seat width direction and each of the right and left first sewn portions 34a extends in the seat width direction.

More specifically, the right and left first sewn portions 34a are disposed at the height position overlapping the plate member 32 in the up to down direction and extend substantially linearly from the right and left end portions of the pocket forming sheet 31 to positions close to the plate member 32.

It should be noted that as illustrated in FIG. 3D, in the present embodiment, the first sewn portions 34a and the fold 35 are disposed at overlapping positions.

The right and left second sewn portions 34b are formed continuously from the extending end portions of the right and left first sewn portions 34a, respectively. The right and left second sewn portions 34b are formed at positions sandwiching the opening portion 30a in the seat width direction. The right and left second sewn portions 34b extend in a direction intersecting the right and left first sewn portions 34a.

More specifically, the right and left second sewn portions 34b extend in a direction substantially orthogonal to the first sewn portions 34a. Specifically, the right and left second sewn portions 34b extend downward from the extending end portions of the first sewn portions 34a and reach one end portion of the pocket forming sheet 31 in the up to down direction.

It should be noted that the right and left first sewn portions 34a and the right and left second sewn portions 34b are disposed at positions that do not intersect the plate member 32.

As illustrated in FIG. 3D, the right and left third sewn portions 34c are respectively formed in the right and left end portions of the pocket forming sheet 31 in the seat width direction and extend elongatedly in the up to down direction.

It should be noted that the upper end portions of the right and left third sewn portions 34c extend to positions somewhat protruding beyond the upper end portion of the pocket forming sheet 31.

The fourth sewn portion 34d is formed in the lower end portion of the pocket forming sheet 31, extends so as to be elongated in the seat width direction, and connects the right and left third sewn portions 34c.

Specifically, in attaching the pocket 30 in the above configuration, sewing work is started from the upper end portion of the third sewn portion 34c on the left side, the third sewn portion 34c on the left side, the fourth sewn portion 34d, and the third sewn portion 34c on the right side are sewn continuously, and the sewing work is completed when the upper end portion of the third sewn portion 34c on the right side is reached. It should be noted that the sewing work may be started from the upper end portion of the third sewn portion 34c on the right side conversely.

As illustrated in FIGS. 2 and 3D, with the above configuration, the opening portion 30a of the pocket 30 is formed at the middle part of the seat back 1 in the seat width direction and does not have a length of reaching the right and left end portions of the seat back 1. Accordingly, with the shape of the opening portion 30a, the closing of the opening portion 30a is improved and the appearance of the conveyance seat S is not impaired.

In addition, in the above configuration, as illustrated in FIG. 3D, the right and left second sewn portions 34b are disposed inside the right and left third sewn portions 34c in the seat width direction.

In other words, in this configuration, the opening portion 30a of the pocket 30 is narrow in the seat width direction and the accommodating portion of the pocket 30 is wide.

Accordingly, the capacity of the pocket 30 can be increased with the shape of the opening portion 30a.

In addition, in the above configuration, as illustrated in FIG. 3D, the plate sewn portion 33 extends in the seat width direction along the extension direction of the plate member 32 and intersects the right and left second sewn portions 34b.

Accordingly, the sewing strength around the opening portion 30a of the pocket 30 can be increased. In other words, the sewing strength of the first sewn portions 34a and the second sewn portions 34b can be increased.

<Conveyance Seat Manufacturing Method>

Next, among the steps of a method for manufacturing the conveyance seat S, a step of manufacturing the pocket 30 will be described with reference to FIGS. 3A to 3D.

It should be noted that the method for manufacturing the conveyance seat S includes, for example, a step of manufacturing the seat main body and the step of manufacturing the pocket 30 on the rear surface of the seat main body (seat back 1).

In the step of manufacturing the pocket 30, first, "first work" is performed to overlap the pocket forming sheet 31 on the outer surface of the back side skin material 20a of the skin material 20 of the seat back 1 disposed on the rear surface of the seat back 1. After that, "second work" is performed to attach the pocket forming sheet to the back side skin material 20a with the pocket sewn portion 34 in an overlapping state.

More specifically, in the "second work", the pocket forming sheet 31 is attached by the right and left first sewn portions 34a and the right and left second sewn portions 34b provided for forming the opening portion 30a of the pocket 30 in the upper end portion of the pocket forming sheet 31 and formed at positions sandwiching the opening portion 30a in the seat width direction, the right and left third sewn portions 34c respectively formed in the right and left end portions of the pocket forming sheet 31 for forming the right and left outer edge portions of the pocket 30, and the fourth sewn portion 34d formed in the lower end portion of the pocket forming sheet 31 for forming the lower edge portion of the pocket 30.

More specifically, in the "second work", in a state where the surface of the pocket forming sheet 31 partially overlaps the outer surface of the back side skin material 20a, the overlapping part is attached by the right and left first sewn portions 34a and the right and left second sewn portions 34b. Then, in a state where the part other than the overlapping part is folded back via the fold 35 provided on the pocket forming sheet 31, the folded part is further attached by the right and left third sewn portions 34c and the fourth sewn portion 34d.

According to the manufacturing method described above, it is possible to realize a conveyance seat manufacturing method by which the capacity of a pocket can be ensured without impairing the appearance of a conveyance seat.

In addition, it is possible to realize a conveyance seat manufacturing method by which the pocket can be simply formed.

<Second Embodiment of Pocket>

Next, a pocket 130 of a second embodiment will be described with reference to FIGS. 4A to 4D.

It should be noted that the description of the content that is common to the pocket 30 and the pocket 130 will be omitted.

The pocket 130 differs from the pocket 30 mainly in the configuration of a pocket sewn portion 134.

The pocket 130 has an opening portion 130a in the upper end portion thereof and is configured mainly from a pocket forming sheet 131, a plate-shaped plate member 132, a plate sewn portion 133, and the pocket sewn portion 134.

The pocket forming sheet 131 is a substantially rectangular sheet, and right and left sheet pieces 131a are formed in the corner portions of the right and left end portions of the pocket forming sheet 131 so as to partially protrude from the main body of the pocket forming sheet 131.

As illustrated in FIG. 3A, the plate-shaped plate member 132 elongated in the seat width direction is attached to one end portion of the back surface of the pocket forming sheet 131 in the up to down direction.

The pocket sewn portion 134 has right and left first sewn portions 134a and right and left second sewn portions 134b forming the opening portion 130a of the pocket, right and left third sewn portions 134c forming the right and left outer edge portions of the pocket 130, and a fourth sewn portion 134d forming the lower edge portion of the pocket 130.

The second sewn portion 134b has a first extending portion 134ba extending in a direction orthogonal to the first sewn portion 134a (downward) and a second extending portion 134bb continuous from the extending end portion of the first extending portion 134ba and extending outward in the seat width direction while being inclined downward.

The second extending portion 134bb extends in a direction inclined with respect to the first sewn portion 134a. Specifically, the second extending portion 134bb extends away from the first sewn portion 134a and outward in the seat width direction while being inclined downward.

It should be noted that the second extending portion 134bb is formed so as to extend along the outer edge of the sheet piece 131a of the pocket forming sheet 131.

With the above configuration, the sewing strength of and around the opening portion 130a of the pocket 130 can be further increased. In addition, interference with the first sewn portion 134a and the second sewn portion 134b can be avoided when an occupant puts a small article into the pocket 130 or takes a small article out of the pocket 130.

In the second embodiment as well, in forming the pocket on the rear surface of the conveyance seat, the capacity of the pocket can be ensured without impairing the appearance of the conveyance seat. In addition, the pocket can be simply formed.

<Details of Seat Heater>

Next, the seat heater 40 will be described in detail with reference to FIGS. 5 to 7.

The main feature of the seat heater 40 of the present embodiment is that the seat heater 40 is attached to the skin material 20 integrated with a cotton-shaped wadding material 21 by sewing only the wadding material 21 by blind stitching such that the sewing line is not exposed.

It should be noted that as for the related art, a sheet-shaped seat heater attached by sewing to a skin material with a cotton-shaped wadding material is known as in International Publication No. WO 2014/091710. The seat heater is sewn to the skin material, and the sewing line is exposed on the outer surface of the skin material. Accordingly, the appearance of a vehicle seat may be affected and the design may be impaired. Alternatively, in order to make the sewing line as inconspicuous as possible, the sewing line and the formation line of a skin pull-in groove (joint) are aligned as a response.

An object in this regard is to provide a conveyance seat with a sheet-shaped seat heater with which the seat heater can be suitably attached to a skin material without impairing the appearance of the conveyance seat.

Figure 5:
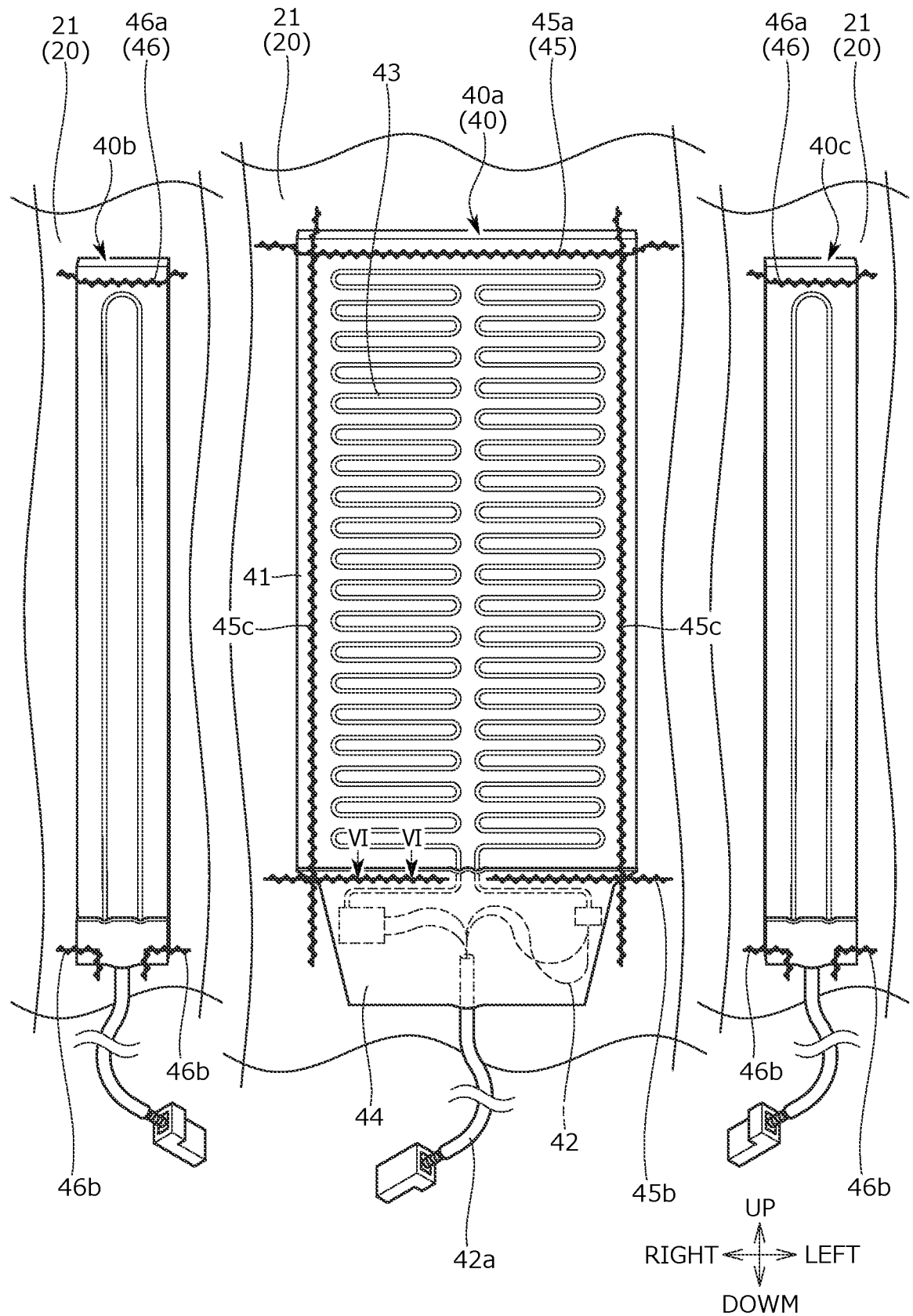
FIG. 5 is a top view illustrating a seat heater (middle and side heaters).

FIG. 5 is a diagram illustrating a state where the seat heater 40 is attached by blind stitching to the back surface of the skin material 20 with the wadding material 21.

The cotton-shaped wadding material 21 (slab material) is attached with an adhesive to substantially the entire back surface of the skin material 20. It should be noted that the wadding material 21 may be attached by, for example, sewing without being limited to the adhesive.

As illustrated in FIGS. 1 and 5, the seat heater 40 is a sheet-shaped heating element (planar heating element) that warms the seat main body. As illustrated in FIG. 1, the seat heater 40 is attached in the seat back 1 and disposed between the cushion material 10 and the skin material 20.

It should be noted that the seat heater 40 is also attached in the seat cushion 2.

The seat heater 40 attached to the seat back 1 will be described below.

The seat heater 40 is configured mainly from a rectangular middle heater 40a disposed in the middle portion 1A of the seat back 1 and side heaters 40b and 40c disposed in the left and right side portions 1B.

The seat heater 40 is configured mainly from a sheet-shaped sheet base material 41, electric wires 42 respectively attached on the sheet base material 41 and connected to a power source (not illustrated), a heater wire 43 connected to the electric wires 42, a temperature measurement sensor (thermistor, not illustrated) connected to the electric wires 42, and a temperature adjustment device (thermostat, not illustrated) connected to the electric wires 42.

The electric wires 42, the heater wire 43, the temperature measurement sensor, and the temperature adjustment device are densely disposed at the lower end part of the seat heater 40, and a cover member 44 is attached to cover these components.

The electric wires 42 supply electricity from the power source (not illustrated) toward the heater wire 43, the temperature measurement sensor, and the temperature adjustment device. A harness 42a is formed at one end part of the electric wires 42 by bundling the plurality of electric wires 42.

The harness 42a is connected to the power source and a control device with one end part thereof attached on the sheet base material 41 and the other end part thereof extending so as to protrude from above the sheet base material 41.

The middle heater 40a is attached by a heater sewn portion 45 to the back surface of the skin material 20 with the wadding material 21.

Figure 6A:
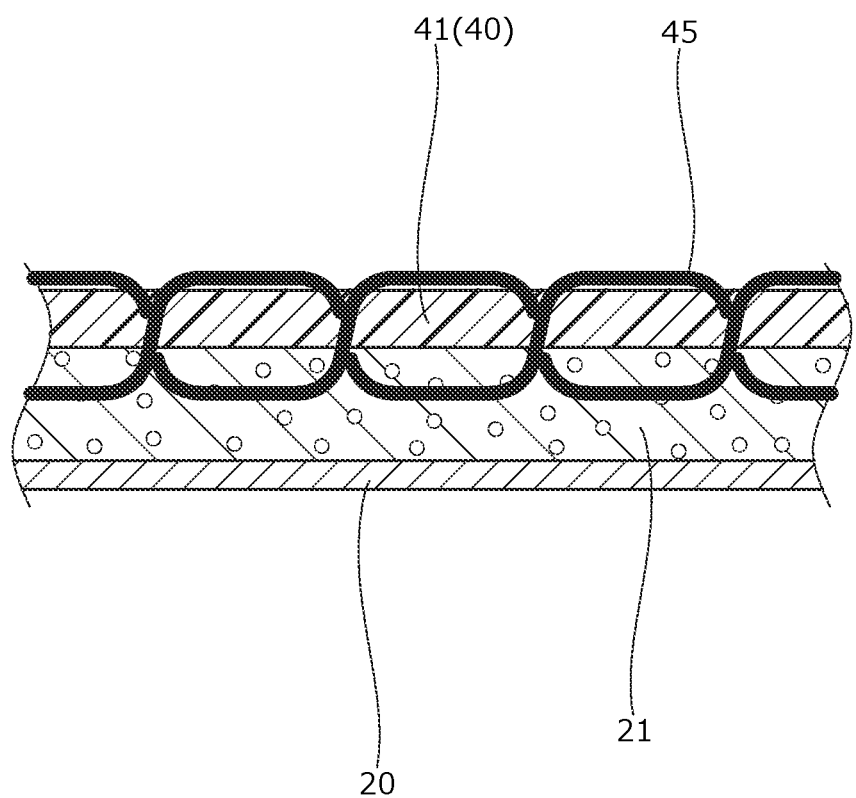
FIG. 6A is a VI-VI cross-sectional view of the seat heater.

As illustrated in FIGS. 5 and 6A, the heater sewn portion 45 is a sewn part formed by blind-stitching the middle heater 40a and the wadding material 21 of the skin material 20 and is formed by, for example, an automatic sewing machine (XY automatic sewing machine).

Specifically, the heater sewn portion 45 has a first sewn portion 45a where the upper end portion of the middle heater 40a is sewn, a second sewn portion 45b where the lower end portion of the middle heater 40a is sewn, and right and left third sewn portions 45c where the right and left end portions of the middle heater 40a are sewn.

It should be noted that the heater sewn portion 45 (second sewn portion 45b in particular) is formed at positions on the sheet base material 41 avoiding the electric wires 42 and the heater wire 43 and linearly extends at each position.

Similarly, the side heater 40b (40c) is attached by a heater sewn portion 46 (blind stitching) to the back surface of the skin material 20 with the wadding material 21.

The heater sewn portion 46 has a first sewn portion 46a where the upper end portion of the side heater 40b is sewn and the second sewn portion 46b where the lower end portion of the side heater 40b is sewn.

It should be noted that the first sewn portion 46a linearly extends along the seat width direction and second sewn portions 46b are disposed on the right and left to avoid the electric wire 42 and the heater wire 43 and formed so as to be substantially L-shaped.

In the above configuration, as illustrated in FIG. 5, each of the first sewn portion 45a and the second sewn portion 45b of the heater sewn portion 45 extends so as to intersect the right and left third sewn portions 45c.

Accordingly, the middle heater 40a can be firmly attached to the skin material 20 (wadding material 21). In particular, the sewing line is not exposed by adopting blind stitching, and thus the heater sewn portion 45 can be formed in a freer disposition than in the related art.

For example, as in the present embodiment, the heater sewn portion 45 can be formed inside the right and left skin pull-in grooves 10a in the seat width direction.

In addition, in the above configuration, as illustrated in FIG. 5, by adopting blind stitching, the side heaters 40b and 40c can be attached to the skin material 20 (wadding material 21) by simple sewing work using the first sewn portion 45a and the second sewn portion 45b.

In other words, it is possible to eliminate the need to match the sewing line of the heater sewn portion 46 and the formation line of the skin pull-in groove 10a as in the related art.

Figure 6B:
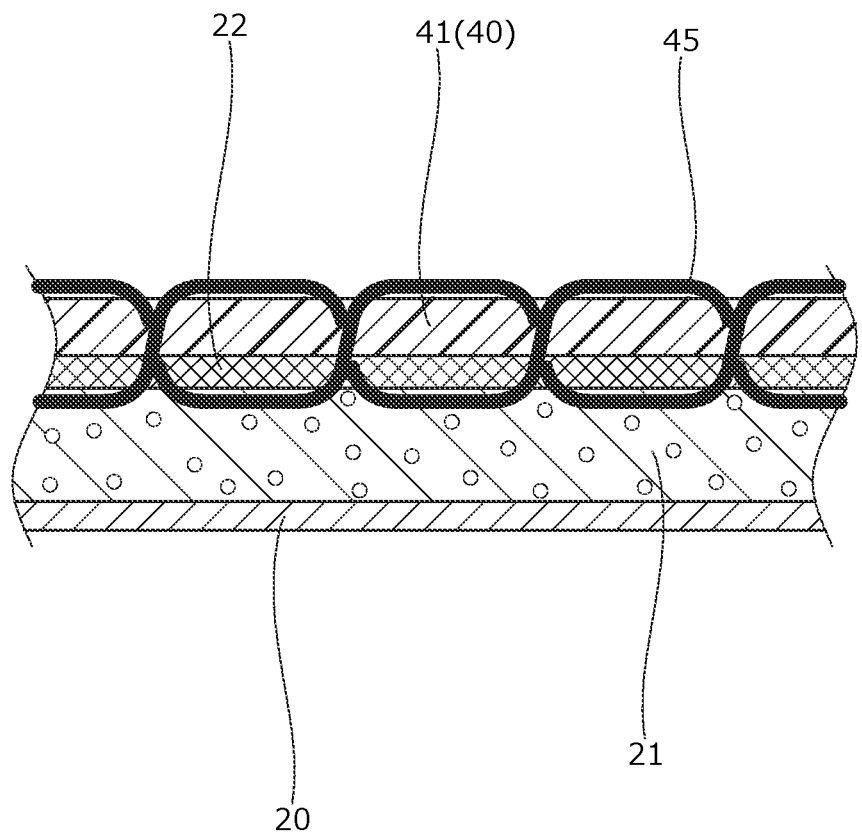
FIG. 6B is a VI-VI cross-sectional view of a seat heater of Modification Example 1.

In addition, in the above configuration, it is possible to adopt the attachment structure illustrated in FIG. 6B as well as the attachment structure illustrated in FIG. 6A.

In FIG. 6B, the wadding material 21 is attached to the back surface of the skin material 20, and a back surface material 22 larger in elastic modulus (harder) than the wadding material 21 is further attached to the back surface of the wadding material 21.

The back surface material 22 is, for example, nylon half or circular knit and is attached to the back surface of the wadding material 21 with an adhesive or the like.

The seat heater 40 is attached to the skin material 20, where the wadding material 21 and the back surface material 22 are integrated, so as to be sewn only to the back surface material 22 by blind stitching.

By performing blind stitching as described above, the seat heater 40 can be firmly attached without sewing line exposure.

It should be noted that the seat heater 40 may be attached so as to be sewn by blind stitching to the wadding material 21 and the back surface material 22.

Figure 7:
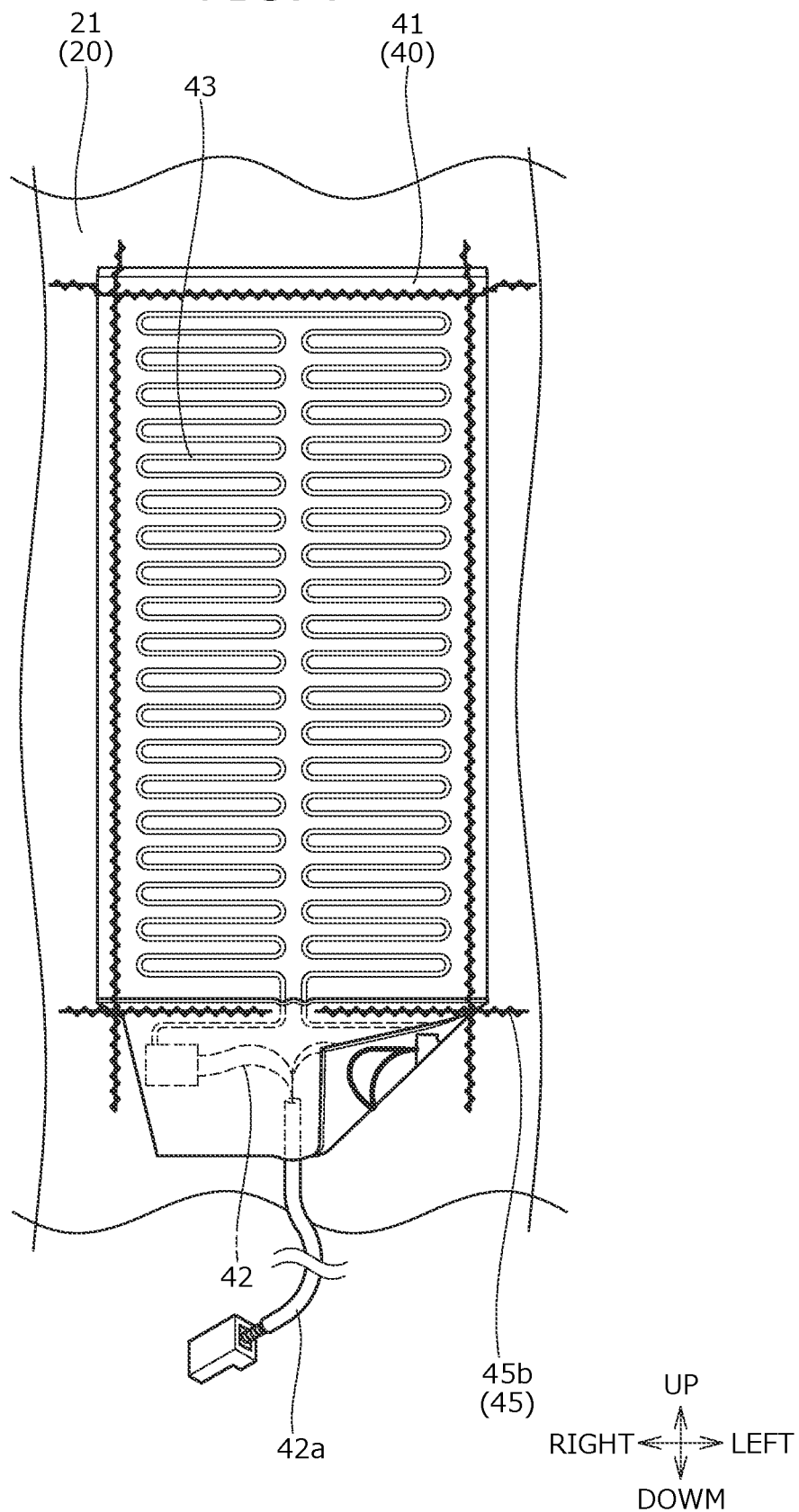
FIG. 7 is a top view of the middle heater, illustrating that the middle heater can be partially folded.

In addition, in the above configuration, as illustrated in FIG. 7, one end portion of the sheet base material 41 in the up to down direction (lower end portion) is formed so as to be narrower than the main body portion of the sheet base material 41.

Then, the lower end portion of the seat heater 40 can be easily folded back using the second sewn portion 45b as a fold line. Accordingly, it is possible to easily perform the work of attaching each component of the seat heater 40 (electric wire 42, heater wire 43, temperature measurement sensor, and temperature adjustment device). In addition, by folding back the lower end portion of the seat heater 40, it is possible to easily confirm the attachment position of each component and confirm that there is no abnormality.

Other Embodiments

In the above embodiment, as illustrated in FIG. 3C, the pocket 30 is formed by folding back the pocket forming sheet 31 once. However, the present invention is not particularly limited thereto and the pocket 30 does not necessarily have to be formed by folding.

In the above embodiment, as illustrated in FIG. 3A, the strength of the opening portion 30a of the pocket 30 is increased by attaching the plate-shaped plate member 32 to the pocket forming sheet 31. However, the present invention is not particularly limited thereto and the plate member 32 may not be attached.

In the above embodiment, a conveyance seat used in an automobile has been described as a specific example. However, the present invention is not particularly limited thereto and the seat can be used as, for example, a conveyance seat for airplanes and ships as well as trains and buses.

In the present embodiment, the conveyance seat and the conveyance seat manufacturing method according to the present invention have been mainly described.

However, the above embodiment is merely an example for facilitating the understanding of the present invention and does not limit the present invention. The present invention may be modified and improved without departing from the spirit thereof, and it is a matter of course that the present invention includes equivalents thereto.

REFERENCE SIGNS LIST

S: conveyance seat
1: seat back
1A, 2A: middle portion
1B, 2B: side portion
2: seat cushion
2a, 3a: cushion material
2aa: skin pull-in groove
2b, 3b: skin material
3: headrest
10: cushion material
10a: skin pull-in groove
20: skin material
20a: back side skin material
21: wadding material
22: back surface material
30, 130: pocket
30a, 130a: opening portion
31, 131: pocket forming sheet (pocket forming member)
131a: sheet piece
32, 132: plate member
33, 133: plate sewn portion
34, 134: pocket sewn portion
34a, 134a: first sewn portion
34b, 134b: second sewn portion
134ba: first extending portion
134bb: second extending portion
34c, 134c: third sewn portion
34d, 134d: fourth sewn portion
35, 135: fold
40: seat heater
40a: middle heater
40b, 40c: side heater
41: sheet base material
42: electric wire
42a: harness
43: heater wire
44: cover member
45: heater sewn portion
45a: first sewn portion
45b: second sewn portion
45c: third sewn portion
46: heater sewn portion
46a: first sewn portion
46b: second sewn portion

The invention claimed is:

1. A conveyance seat comprising a pocket on a rear surface of a seat back,
wherein the seat back comprises a skin material serving as a covering material for the seat back,
wherein the pocket comprises:
a sheet-shaped pocket forming member overlapping an outer surface of a back side skin material positioned on the rear surface of the seat back; and
a pocket sewn portion for attaching the pocket forming member to the back side skin material in an overlapping state,
wherein the pocket sewn portion comprises:
right and left first sewn portions provided in order to form an opening portion of the pocket in an upper end portion of the pocket forming member, formed at positions sandwiching the opening portion in a seat width direction, and each extending in the seat width direction;
right and left second sewn portions formed at positions sandwiching the opening portion in the seat width direction, respectively connected to the right and left first sewn portions, and extending in a direction intersecting the right and left first sewn portions;
right and left third sewn portions respectively formed in both end portions of the pocket forming member in the seat width direction in order to form right and left outer edge portions of the pocket and extending in an up to down direction; and
a fourth sewn portion formed in a lower end portion of the pocket forming member in order to form a lower edge portion of the pocket and extending in the seat width direction,
wherein the right and left second sewn portions are disposed inside the right and left third sewn portions in the seat width direction,
wherein in a state where a surface of the pocket forming member partially overlaps the outer surface of the back side skin material, the right and left first sewn portions and the right and left second sewn portions are formed at the overlapping part, and
wherein in a state where a part other than the overlapping part is folded back via a fold provided on the pocket forming member, the right and left third sewn portions and the fourth sewn portion are formed at the folded part.

2. The conveyance seat according to claim 1, wherein the pocket comprises a plate-shaped plate member attached to the pocket forming member at a position corresponding to the opening portion and extending in the seat width direction along the opening portion, and
the plate member is disposed between the right and left second sewn portions in the seat width direction and is disposed at a position not intersecting the right and left second sewn portions.

3. The conveyance seat according to claim 2, wherein the pocket comprises a plate sewn portion for attaching the plate member to the pocket forming member, and
the plate sewn portion extends in the seat width direction along the extension direction of the plate member and intersects the right and left second sewn portions.

4. The conveyance seat according to claim 1, wherein the right and left second sewn portions respectively extend in a direction substantially orthogonal to the right and left first sewn portions.

5. The conveyance seat according to claim 1, wherein the second sewn portion comprises:
   a first extending portion extending in a direction intersecting the first sewn portion; and
   a second extending portion connected to the first extending portion and extending outward in the seat width direction from the first extending portion in a direction intersecting the first extending portion.

6. The conveyance seat according to claim 5, wherein the second extending portion of the second sewn portion extends in a direction inclined with respect to the first sewn portion.

7. The conveyance seat according to claim 5, wherein the second extending portion of the second sewn portion extends outward in the seat width direction away from the first sewn portion.

8. A method for manufacturing a conveyance seat provided with a pocket on a rear surface of a seat back, the conveyance seat manufacturing method, comprising a step of manufacturing the pocket,
   wherein in the step of manufacturing the pocket,
      a sheet-shaped pocket forming member is caused to overlap an outer surface of a back side skin material disposed on the rear surface of the seat back as a part of a skin material serving as a covering material for the seat back, and
      the pocket forming member is attached to the back side skin material by a pocket sewn portion in an overlapping state,
   wherein when the pocket forming member is attached, the pocket forming member is attached by:
      right and left first sewn portions provided in order to form an opening portion of the pocket in an upper end portion of the pocket forming member, formed at positions sandwiching the opening portion in a seat width direction, and each extending in the seat width direction;
      right and left second sewn portions formed at positions sandwiching the opening portion in the seat width direction, respectively connected to the right and left first sewn portions, and extending in a direction intersecting the right and left first sewn portions;
      right and left third sewn portions respectively formed in both end portions of the pocket forming member in the seat width direction in order to form right and left outer edge portions of the pocket and extending in an up to down direction such that the right and left second sewn portions are disposed inside in the seat width direction; and
      a fourth sewn portion formed in a lower end portion of the pocket forming member in order to form a lower edge portion of the pocket and extending in the seat width direction,
   wherein when the pocket forming member is attached,
      in a state where a surface of the pocket forming member partially overlaps the outer surface of the back side skin material, the overlapping part is attached by the right and left first sewn portions and the right and left second sewn portions, and
      in a state where a part other than the overlapping part is folded back via a fold provided on the pocket forming member, the folded part is further attached by the right and left third sewn portions and the fourth sewn portion.

9. A conveyance seat comprising a pocket on a rear surface of a seat back,
   wherein the seat back comprises a skin material serving as a covering material for the seat back,
   wherein the pocket comprises:
      a sheet-shaped pocket forming member overlapping an outer surface of a back side skin material positioned on the rear surface of the seat back; and
      a pocket sewn portion for attaching the pocket forming member to the back side skin material in an overlapping state,
   wherein the pocket sewn portion comprises:
      right and left first sewn portions provided in order to form an opening portion of the pocket in an upper end portion of the pocket forming member, formed at positions sandwiching the opening portion in a seat width direction, and each extending in the seat width direction;
      right and left second sewn portions formed at positions sandwiching the opening portion in the seat width direction, respectively connected to the right and left first sewn portions, and extending in a direction intersecting the right and left first sewn portions;
      right and left third sewn portions respectively formed in both end portions of the pocket forming member in the seat width direction in order to form right and left outer edge portions of the pocket and extending in an up to down direction; and
      a fourth sewn portion formed in a lower end portion of the pocket forming member in order to form a lower edge portion of the pocket and extending in the seat width direction,
   wherein the right and left second sewn portions are disposed inside the right and left third sewn portions in the seat width direction,
   wherein the pocket comprises a plate-shaped plate member attached to the pocket forming member at a position corresponding to the opening portion and extending in the seat width direction along the opening portion, and
   wherein the plate member is disposed between the right and left second sewn portions in the seat width direction and is disposed at a position not intersecting the right and left second sewn portions.

10. The conveyance seat according to claim 9, wherein the pocket comprises a plate sewn portion for attaching the plate member to the pocket forming member, and
   the plate sewn portion extends in the seat width direction along the extension direction of the plate member and intersects the right and left second sewn portions.

11. The conveyance seat according to claim 9, wherein the right and left second sewn portions respectively extend in a direction substantially orthogonal to the right and left first portions.

12. The conveyance seat according to claim 9, wherein the second sewn portion comprises:
   a first extending portion extending in a direction intersecting the first sewn portion; and
   a second extending portion connected to the first extending portion and extending outward in the seat width direction from the first extending portion in a direction intersecting the first extending portion.

13. The conveyance seat according to claim 12, wherein the second extending portion of the second sewn portion extends in a direction inclined with respect to the first sewn portion.

14. The conveyance seat according to claim 12, wherein the second extending portion of the second sewn portion extends outward in the seat width direction away from the first sewn portion.

* * * * *